US011090983B2

(12) United States Patent
    Kamada (10) Patent No.: US 11,090,983 B2
(45) Date of Patent: Aug. 17, 2021

(54) PNEUMATIC TIRE

(71) Applicant: TOYO TIRE & RUBBER CO., LTD., Itami (JP)

(72) Inventor: Nobuyuki Kamada, Itami (JP)

(73) Assignee: TOYO TIRE CORPORATION, Hyogo (JP)

( * ) Notice: Subject to any disclaimer, the term of this patent is extended or adjusted under 35 U.S.C. 154(b) by 272 days.

(21) Appl. No.: 15/949,316

(22) Filed: Apr. 10, 2018

(65) Prior Publication Data

US 2018/0312011 A1 Nov. 1, 2018

(30) Foreign Application Priority Data

Apr. 27, 2017 (JP) .............................. JP2017-088811

(51) Int. Cl.
    *B60C 11/12* (2006.01)
    *B60C 11/03* (2006.01)

(52) U.S. Cl.
    CPC ...... *B60C 11/1236* (2013.01); *B60C 11/0304* (2013.01); *B60C 11/0306* (2013.01);
    (Continued)

(58) Field of Classification Search
    CPC ............................ B60C 11/12; B60C 11/1236
    See application file for complete search history.

(56) References Cited

U.S. PATENT DOCUMENTS

| 5,814,169 A * | 9/1998 | Yamaguchi ............. B60C 11/11 152/209.22 |
| 2010/0326577 A1* | 12/2010 | Iwai .................... B60C 11/1369 152/209.24 |

(Continued)

FOREIGN PATENT DOCUMENTS

| CN | 203418936 U | * | 2/2014 |
| JP | H0740714 A | * | 4/1987 |

(Continued)

OTHER PUBLICATIONS

Office Action dated Jul. 30, 2020, issued in counterpart CN application No. 201810281269.X, with English translation. (17 pages).

(Continued)

*Primary Examiner* — Robert C Dye
*Assistant Examiner* — Farah Taufiq
(74) *Attorney, Agent, or Firm* — Westerman, Hattori, Daniels & Adrian, LLP (57) ABSTRACT

A pneumatic tire includes a land portion having a circumferential direction sipe extending in a direction inclined with respect to the tire circumferential direction, a partial land portion positioned on at least one of the land portion partitioned with the circumferential direction sipe, and a plurality of cross sipes extending in a direction intersecting with the circumferential direction sipe in the partial land portion. The partial land portion includes a wide end portion and a narrow end portion. The plurality of cross sipes include a wide portion sipe located closest to a wide end of the partial land portion, and a narrow portion sipe located closest to a narrow end of the partial land portion. The wide portion sipe has a distal end positioned in a sipe projection portion, and the narrow portion sipe has a distal end positioned in a non-sipe projection portion.

13 Claims, 6 Drawing Sheets

(52) U.S. Cl.
CPC ....... *B60C 11/12* (2013.01); *B60C 2011/1209* (2013.01); *B60C 2011/1245* (2013.01); *B60C 2011/1254* (2013.01)

(56) References Cited

U.S. PATENT DOCUMENTS

| | | | |
|---|---|---|---|
| 2014/0238566 A1 | 8/2014 | Takahashi | |
| 2016/0325590 A1* | 11/2016 | Moser | B60C 11/11 |
| 2017/0100965 A1* | 4/2017 | Kikuchi | B60C 11/0304 |
| 2017/0320360 A1* | 11/2017 | Yamakawa | B60C 11/1236 |
| 2018/0079260 A1 | 3/2018 | Suzuki | |
| 2018/0134089 A1* | 5/2018 | Durand-Gasselin | B60C 11/1236 |

FOREIGN PATENT DOCUMENTS

| | | |
|---|---|---|
| JP | 2014-162295 A | 9/2014 |
| WO | 2016/163207 A1 | 10/2016 |

OTHER PUBLICATIONS

Office Action dated Dec. 22, 2020, issued in counterpart Japanese application No. 2017-088811 (7 pages; w/English machine translation).

Office Action dated Apr. 16, 2021, issued in counterpart Chinese application No. 201810281269.X (13 pages; w/English machine translation).

* cited by examiner

PNEUMATIC TIRE

CROSS-REFERENCE TO RELATED APPLICATIONS

This application claims priority of Japanese Patent Application No.: 2017-88811 filed on Apr. 27 2017, the content of which is incorporated herein by reference.

BACKGROUND OF THE INVENTION

Technical Field

The present invention relates to a pneumatic tire.

Related Art

It is known that in a pneumatic tire including land portions (for example, ribs) partitioned with plurality of main grooves extending in a tire circumferential direction, forming circumferential direction sipes extending in a direction slanting toward the tire circumferential direction in the land portions increases the groove volume to improve drainage performance (for example, see Japanese Unexamined Patent Application Publication No. 2014-162295).

SUMMARY

However, when the circumferential direction sipes are slanted toward the tire circumferential direction, partial land portions partitioned in the tire width direction with the circumferential direction sipes have different widths in the tire circumferential direction. That is, when the circumferential direction sipe extends in a direction slanting toward one side in the tire width direction as the circumferential direction sipe goes to one side in the tire circumferential direction, the partial land portions partitioned on the other side in the tire width direction of the circumferential direction sipe have widths in the tire width direction increasing toward one side in the tire circumferential direction.

In this case, since the partial land portion has the configuration in which an end portion on one side in the tire circumferential direction is relatively wide, whereas an end portion on the other side in the tire circumferential direction is relatively narrow, the rigidity of the end portion on one side becomes relatively high and the rigidity of the end portion on the other side becomes relatively low. As a result, the rigidity difference between both end portions of the partial land portion in the tire circumferential direction is increased, and uneven wear in the tire circumferential direction is increased.

It is an object of the present invention to provide a pneumatic tire having improved drainage performance due to the formation of a circumferential direction sipe extending in a direction slanting toward the tire circumferential direction in the land portion, the pneumatic tire being capable of suppressing uneven wear in the tire circumferential direction.

The present invention provides a pneumatic tire including a main groove extending in a tire circumferential direction; a lateral groove extending in a tire width direction; and a land portion defined by the main groove and the lateral groove. The land portion includes a circumferential direction sipe extending in a direction inclined with respect to the tire circumferential direction and partitioning the land portion, a partial land portion positioned on at least one side in a tire width direction of the land portion with respect to the circumferential direction sipe, and a plurality of cross sipes extending in a direction intersecting with the circumferential direction sipe in the partial land portion. The partial land portion includes a wide end portion relatively wide on one side and a narrow end portion relatively narrow on the other side in the tire circumferential direction. The plurality of cross sipes include a wide portion sipe located closest to a wide end of the partial land portion in the tire circumferential direction and a narrow portion sipe located closest to a narrow end of the partial land portion in a tire circumferential direction. The wide portion sipe has a distal end, positioned closer to the circumferential direction sipe, which is positioned in a sipe projection portion defined by a projection of the circumferential direction sipe in the tire circumferential direction. The narrow portion has a distal end, positioned closer to the circumferential direction sipe, which is positioned in a non-sipe projection portion which is a portion other than the sipe projection portion of the partial land portion.

According to the present invention, in the wide end portion being wider in width of the partial land portion, the wide portion sipe bites into the sipe projection portion, and in the narrow end portion being narrower in width of the partial land portion, the narrow portion sipe does not bite into the sipe projection portion and terminates in the non-sipe projection portion. As a result, while the rigidity of the wide end portion, which is likely to have relatively high rigidity, is effectively lowered, reduction in the rigidity of the narrow end portion, which is likely to have relatively low rigidity, is suppressed.

That is, since the rigidity difference between the end portions in the tire circumferential direction of the partial land portion defined by the circumferential direction sipe is reduced while the circumferential direction sipe extending slantingly toward the tire circumferential direction is formed in the land portion, uneven wear in the tire circumferential direction can be suppressed.

Preferably, the distal end of the wide portion sipe is positioned in a range of one third of the sipe projection portion which is located closer to the circumferential direction sipe in the tire width direction.

According to the present configuration, since the wide portion sipe is configured to be sufficiently long, the rigidity of the wide end portion can be sufficiently reduced with the wide portion sipe.

In addition, preferably, the distal end of the narrow portion sipe is positioned in a range of one third of the non-sipe projection portion which is located closer to the sipe projection portion in the tire width direction.

According to the present configuration, since the narrow portion sipe is configured to be appropriately long, the rigidity of the narrow end portion can be appropriately reduced with the narrow portion sipe.

In addition, preferably, the plurality of cross sipes are formed in each of a pair of the partial land portions positioned adjacent to each other in a tire circumferential direction across the lateral groove. A difference in distances from the lateral groove to a respective pair of the cross sipes positioned closest to the lateral groove in each of the pair of partial land portions in the tire circumferential direction, is not larger than 10% of a longer distance of the distances. Furthermore, each of distances in a tire circumferential direction from the lateral groove to each of the pair of cross sipes positioned adjacent to each other in a tire circumferential direction across the lateral groove may be is not smaller than 7% and not larger than 35% of a length in a tire circumferential direction of the partial land portion in which each of the pair of cross sipes is formed.

According to the present configuration, since the rigidity between the partial land portions adjacent in the tire circumferential direction across the lateral groove is substantially equalized, uneven wear in the tire circumferential direction can be further suppressed.

In addition, preferably, the lateral groove extends in a direction crossing at a crossing angle θ1 to a tire circumferential direction. The pair of cross sipes positioned adjacent to each other in a tire circumferential direction across the lateral groove extend at crossing angles θ2 and θ3 to a tire circumferential direction. Each of differences in angle from the crossing angle θ1 to crossing angle θ2 and θ3 is not larger than 10% of the crossing angle θ1.

According to the present configuration, since a pair of cross sipes positioned closest to both sides in the tire circumferential direction across the lateral groove extend substantially parallel to the lateral groove, the rigidity of the end portion of the partial land portion in the tire circumferential direction is easily reduced substantially uniformly over the tire width direction. Thus, since increase or decrease in local rigidity in the tire width direction is suppressed, uneven wear in the tire width direction can also be suppressed while uneven wear in the tire circumferential direction is suppressed.

In addition, the plurality of cross sipes are formed on at least one of the partial land portions partitioned in a tire width direction with the circumferential direction sipe. Preferably, the plurality of cross sipes are formed in at least the partial land portions partitioned on an outer side in a tire width direction with the circumferential direction sipe.

According to the present configuration, forming a plurality of cross sipes in the tire width direction outer side portion of land portions susceptible to deformation in the tire width direction and the tire circumferential direction particularly in a grounded state allows the uneven wear caused by the deformation to be suppressed even more effectively.

In addition, preferably, the distal end of the wide portion sipe communicates with the circumferential direction sipe.

In addition, preferably, the circumferential direction sipe slants toward a tire circumferential direction at a slanting angle of 10° or less.

According to the present invention, uneven wear in the tire circumferential direction can be suppressed in a pneumatic tire having improved drainage performance due to the formation of a circumferential direction sipe extending in a direction slanting toward the tire circumferential direction in the land portion.

BRIEF DESCRIPTION OF THE DRAWINGS

The foregoing and the other features of the present invention will become apparent from the following description and drawings of an illustrative embodiment of the invention in which.

DETAILED DESCRIPTION OF EMBODIMENTS

In the following, an embodiment according to the present invention will be described with reference to the accompanying drawings. It should be noted that the following description is, fundamentally, merely illustrative and is not intended to limit the present invention, products to which the present invention is applied, or applications of the present invention. In addition, the drawings are schematic, and the ratio and the like of each dimension are different from actual ones.

Figure 1:
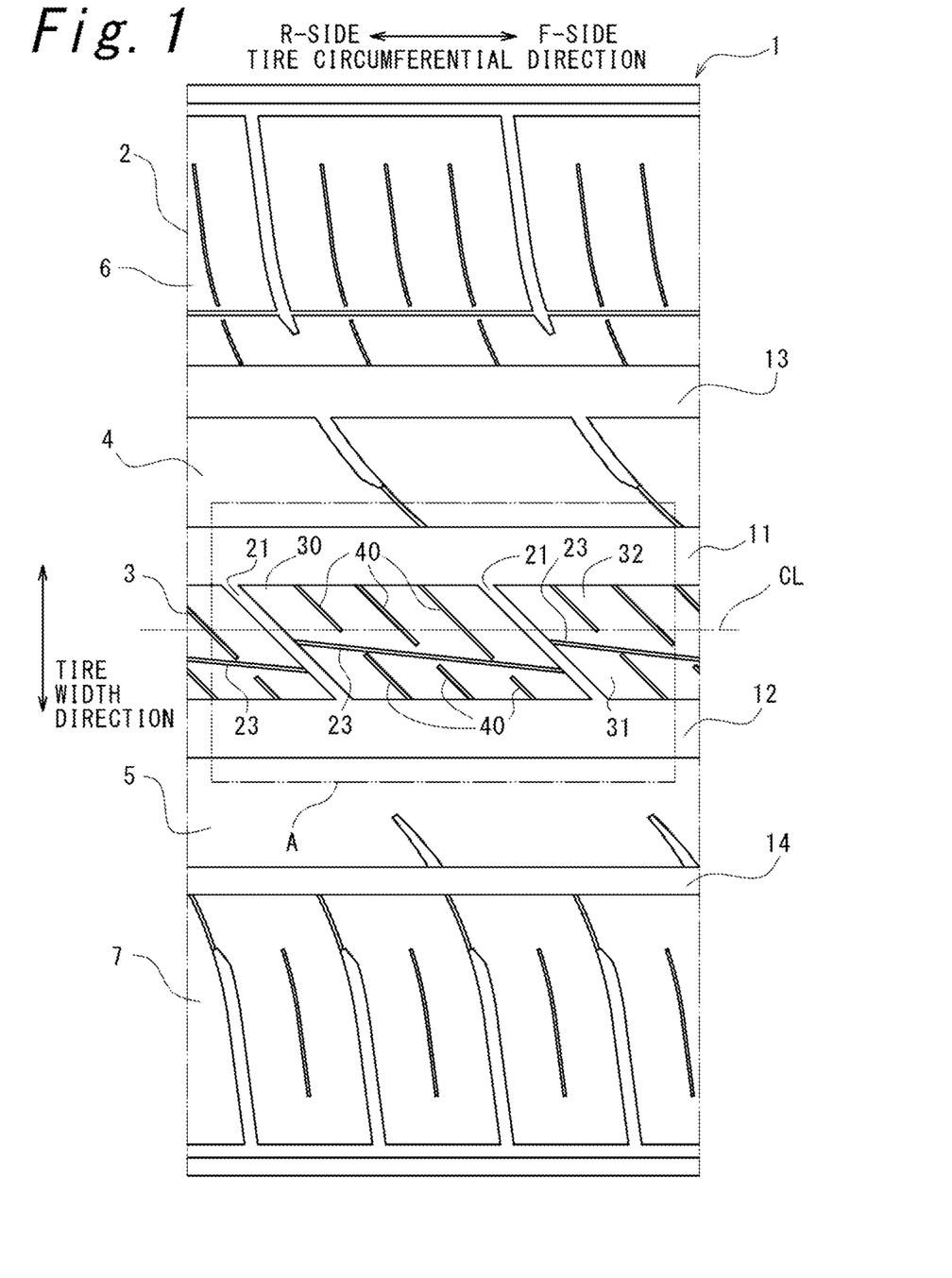
FIG. 1 is a plan view showing a developed tread pattern of a pneumatic tire according to an embodiment of the present invention.

FIG. 1 is a plan view showing a developed tread pattern of a tread portion 2 of a pneumatic tire 1 according to an embodiment of the present invention. It should be noted that for convenience of explanation, the direction toward the right side in the drawing in the tire circumferential direction is referred to as F side, and the direction toward the left side in the drawing is referred to as R side.

As shown in FIG. 1, four main grooves 11 to 14 extending in the tire circumferential direction are formed in the tread portion 2. Specifically, two central main grooves 11 and 12 are formed in a substantially central portion in the tire width direction, and two outer main grooves 13 and 14 are respectively formed on the outside of these two central main grooves 11 and 12 in the tire width direction. The central main grooves 11 and 12 are positioned on both sides across a tire equator line CL.

A center land portion 3 is partitioned between the central main grooves 11 and 12. A mediate land portion 4 is partitioned between the central main groove 11 and the outer main groove 13, and a mediate land portion 5 is partitioned between the central main groove 12 and the outer main groove 14. Furthermore, shoulder land portions 6 and 7 are respectively partitioned outside the outer main grooves 13 and 14 in the tire width direction.

That is, the tread portion 2 is configured as a rib pattern including the five land portions 3 to 7 extending in the tire circumferential direction with the four main grooves 11 to 14 extending in the tire circumferential direction.

In the center land portion 3, a lug groove 21 and a width direction sipe 40 (cross sipe) extending in the tire width direction and a circumferential direction sipe 23 extending in the tire circumferential direction are formed.

Herein, terms such as a circumferential direction sipe and a width direction sipe may be used, and these sipes mean those formed with a plate-shaped sipe blade in a tire vulcanization mold. In other words, the sipe means a groove in which the groove width is about 1.5 mm or less and the groove wall surfaces facing each other are in contact with each other in a grounded state.

In the following, the center land portion 3 will be described with reference to FIG. 2.

Figure 2:
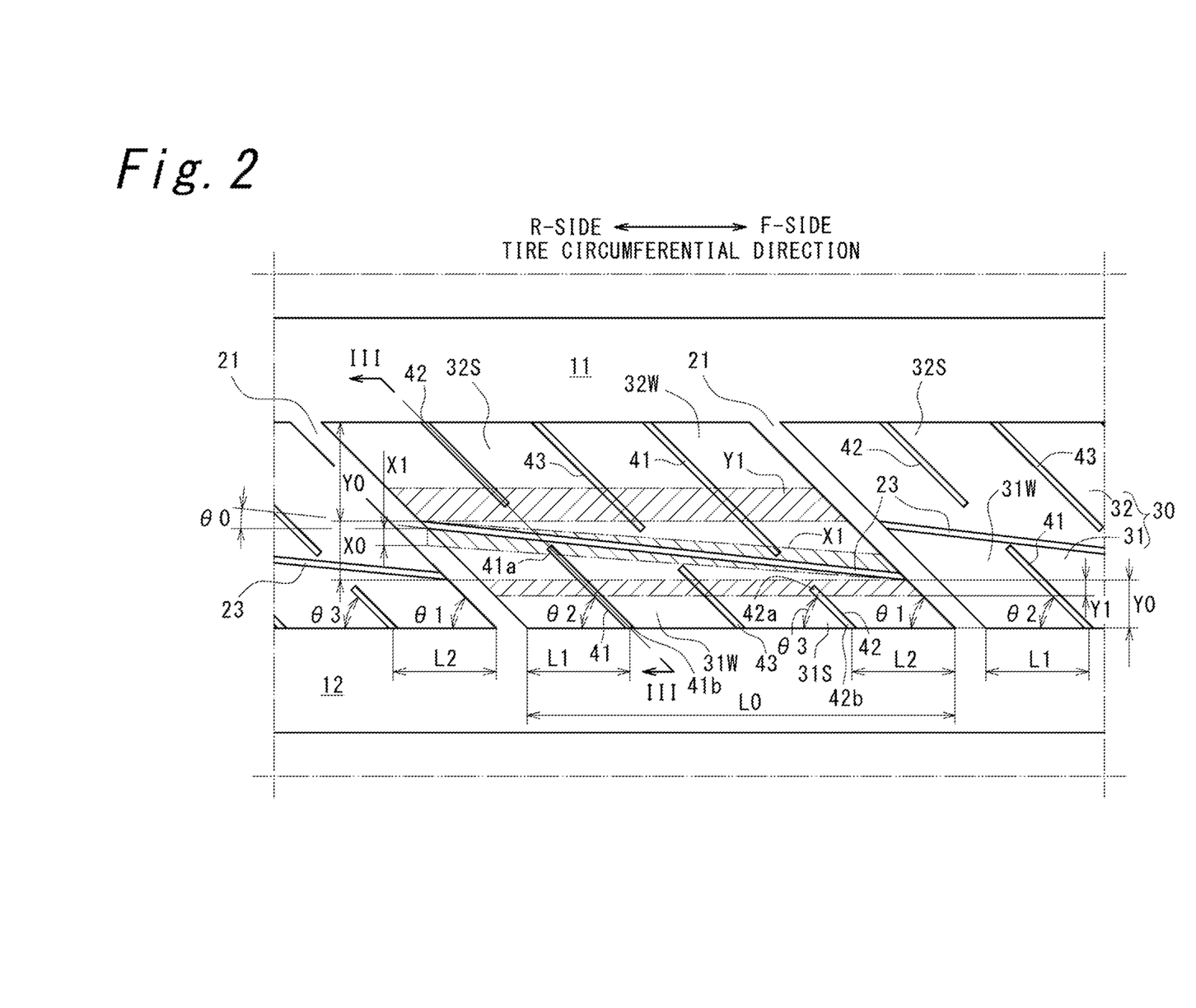
FIG. 2 is an enlarged view of a portion A in FIG. 1.

FIG. 2 is an enlarged view of a portion A in FIG. 1. As shown in FIG. 2, a plurality of lug grooves 21 are formed at intervals in the tire circumferential direction, each lug groove 21 extends slantingly toward the F side in the tire circumferential direction from one end portion communicating with the central main groove 11 toward the central main groove 12, and the other end communicates with the central main groove 12. That is, the center land portion 3 is partitioned in the tire circumferential direction into a plurality of blocks 30 with the lug grooves 21.

The circumferential direction sipe 23 extends in the tire circumferential direction between a pair of the lug grooves 21 and 21 positioned adjacent in the tire circumferential direction, and extends in a direction slanting toward the central main groove 11 from the lug groove 21 positioned on the F side in the tire circumferential direction toward the R side in the tire circumferential direction to reach the lug groove 21 positioned on the R side in the tire circumferential direction. A crossing angle θ0 of the circumferential direction sipe 23 to the tire circumferential direction is set to 10° or less. That is, each of the blocks 30 is partitioned in the tire width direction with the circumferential direction sipe 23 into a pair of a first block 31 positioned on the side of the central main groove 12 and a second block 32 positioned on the side of the central main groove 11.

It should be noted that since the crossing angle θ0 to the tire circumferential direction is set to 10° or less in the circumferential direction sipe 23, the circumferential direction sipe 23 is configured to be longer in length, and as a result, the groove volume effectively increases, and the drainage effect by the circumferential direction sipe 23 can be effectively exerted.

In the first block 31, an end portion positioned on the R side in the tire circumferential direction is configured as a wide end portion 31W having a relatively wide width, and an end portion positioned on the F side in the tire circumferential direction is configured as a narrow end portion 31S having a relatively narrow width. In other words, the first block 31 is configured to be wider toward the R side in the tire circumferential direction.

In the second block 32, an end portion positioned on the F side in the tire circumferential direction is configured as a wide end portion 32W having a relatively wide width, and an end portion positioned on the R side in the tire circumferential direction is configured as a narrow end portion 32S having a relatively narrow width. In other words, the second block 32 is configured to be narrower toward the R side in the tire circumferential direction.

A plurality of the width direction sipes 40 are formed in each of the first block 31 and the second block 32. In the following, the width direction sipes 40 formed in the first block 31 will be described as an example.

The width direction sipes 40 include a wide portion sipe 41 formed closest to a wide end of the first block 31, a narrow portion sipe 42 formed closest to a narrow end of the first block 31, and an intermediate portion sipe 43 formed between the wide portion sipe 41 and the narrow portion sipe 42 in the tire circumferential direction.

Of the blocks 30, the portion where the circumferential direction sipe 23 is projected in the tire circumferential direction is referred to as a sipe projection portion X0, the other portion is referred to as a non-sipe projection portion Y0, and the wide portion sipe 41 and the narrow portion sipe 42 are formed as follows in relation to the sipe projection portion X0 and the non-sipe projection portion Y0.

The wide portion sipe 41 extends in the tire width direction from distal end 41a on the side of the circumferential direction sipe 23 to the other end 41b communicating with the central main groove 12. Specifically, the distal end 41a of the wide portion sipe 41 is positioned in the sipe projection portion X0, and more specifically, is positioned in a range X1 (indicated by hatching in FIG. 2) of one third of the sipe projection portion X0 which is located closer to the circumferential direction sipe 23 in the tire width direction. In other words, the wide portion sipe 41 bites into the sipe projection portion X0 at least in a range of two third in the tire width direction and extends over the entire area of the non-sipe projection portion Y0.

The narrow portion sipe 42 extends in the tire width direction from distal end 42a on the side of the circumferential direction sipe 23 to the other end 42b communicating with the central main groove 12. Specifically, the distal end 42a of the narrow portion sipe 42 is positioned in the non-sipe projection portion Y0, and more specifically, is positioned in a range Y1 (indicated by hatching in FIG. 2) of one third of the non-sipe projection portion Y0 which is located closer to the circumferential direction sipe 23 in the tire width direction. In other words, the narrow portion sipe 42 extends in a range of at least two third to the non-sipe projection portion Y0 in the tire width direction, and does not extend to the sipe projection portion X0.

In addition, regarding the pair of first blocks 31 partitioned on both sides in the tire circumferential direction across the lug groove 21, the width direction sipes 40 formed in the first blocks 31 are formed to have the following relationship.

That is, a pair of the wide portion sipe 41 and the narrow portion sipe 42 positioned closest to the lug groove 21 in each of the pair of first blocks 31 are set so that the respective distances L1 and L2 from the lug groove 21 in the tire circumferential direction are substantially equal to each other. Specifically, in the pair of the wide portion sipe 41 and the narrow portion sipe 42 across the lug groove 21, the difference between the distances L1 and L2 is not larger than 10% of the longer one of the distances L1 and L2.

The distances L1 and L2 from the lug groove 21 are measured on a cross section taken along the tire circumferential direction in any tire width direction position, and are the distances from the edge portion in the tire circumferential direction of each of the blocks 30 partitioned by the lug groove 21 to the center position in the tire circumferential direction of the target width direction sipe 40. It should be noted that in FIG. 2, as an example, the distances L1 and L2 at the edge portion of the first block 31 on the side of the central main groove 12 are shown. It should be noted that it is desirable that the distances L1 and L2 be set to be not less than 7% and not larger than 35%, preferably not less than 15% and not larger than 30% of the length L0 in the tire circumferential direction of the first block 31 in order to reduce the rigidity of the wide end portion 31W and the narrow end portion 31S.

In addition, a crossing angle θ2 of the wide portion sipe 41 to the tire circumferential direction and a crossing angle θ3 of the narrow portion sipe 42 to the tire circumferential direction each are set to have an angle difference of 10% or less to the crossing angle θ1 of the lug groove 21 to the tire circumferential direction.

Figure 3:
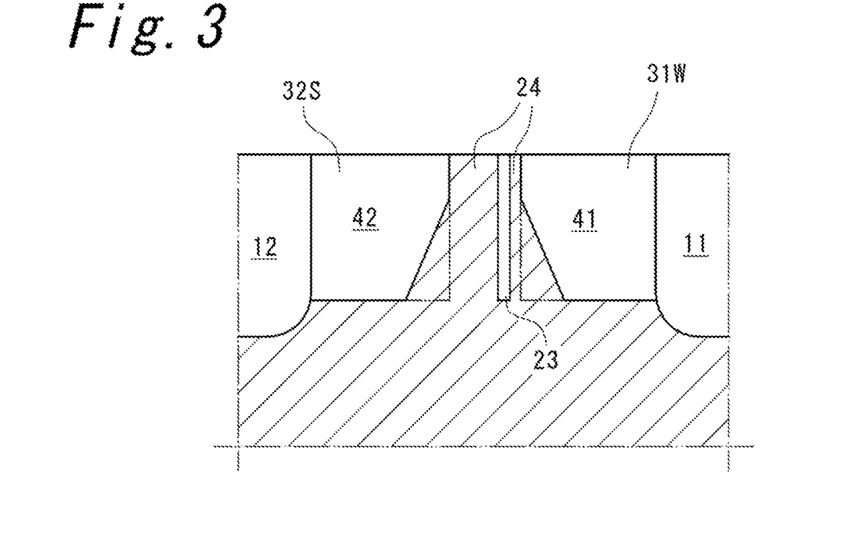
FIG. 3 is a cross-sectional view taken along line III-III in FIG. 2.

FIG. 3 is a cross-sectional view taken along line III-III in FIG. 2, and is a cross-sectional view taken along the width direction sipe 40 positioned on the R side in the tire circumferential direction of each of the blocks 30 as viewed in the tire circumferential direction. In the cross section shown in FIG. 3, the wide end portion 31W of the first block 31 is shown on the right side in the drawing, and the narrow end portion 32S of the second block 32 is shown on the left side in the drawing. That is, the wide portion sipe 41 is shown on the right side across the circumferential direction sipe 23 in the drawing, and the narrow portion sipe 42 is shown on the left side in the drawing.

As shown in FIG. 3, partition wall portions 24 are formed between each of the wide portion sipe 41 and the narrow portion sipe 42 and the circumferential direction sipe 23.

Although in each of the partition wall portions 24, the inner portion in the tire radial direction is formed wider than the surface side, instead of this, as indicated with a two-dot chain line, each of the partition wall portions 24 may be configured to extend in the tire radial direction to have a constant width in the tire width direction.

In addition, the wide portion sipe 41 may be formed to communicate with the circumferential direction sipe 23, and in this case, the partition wall portions 24 are not formed in the wide end portion 31W of the first block 31.

According to the pneumatic tire 1 described above, the following effects are obtained. It should be noted that in the following description, the first block 31 will be described as an example, but the same effects are also obtained in the second block 32.

(1) In the wide end portion 31W of the first block 31, the wide portion sipe 41 bites into the sipe projection portion X0, and in the narrow end portion 31S of the first block 31, the narrow portion sipe 42 does not bite into the sipe projection portion X0 and terminates in the non-sipe projection portion Y0. As a result, while the rigidity of the wide end portion 31W, which is likely to have relatively high rigidity, is effectively lowered, excessive reduction in the rigidity of the narrow end portion 31S, which is likely to have relatively low rigidity, is suppressed.

That is, since the rigidity difference between the wide end portion 31W and the narrow end portion 31S positioned at both ends in the tire circumferential direction of the first block 31 defined by the circumferential direction sipe 23 is reduced while the circumferential direction sipe 23 extending slantingly toward the tire circumferential direction is formed in each of the blocks 30, uneven wear in the tire circumferential direction can be suppressed.

(2) Since the distal end 41a of the wide portion sipe 41 on the side of the circumferential direction sipe 23 is positioned in the range X1 of one third of the sipe projection portion X0 which is located closer to the circumferential direction sipe 23 in the tire width direction, the wide portion sipe 41 is configured to be sufficiently long, so that the rigidity of the wide end portion 31W can be sufficiently lowered with the wide portion sipe 41.

(3) Since the distal end 42a of the narrow portion sipe 42 on the side of the circumferential direction sipe 23 is positioned in the range Y1 of one third of the non-sipe projection portion Y0 which is located closer to the sipe projection portion X0 in the tire width direction, the narrow portion sipe 42 is configured to be appropriately long, so that the rigidity of the narrow end portion 31S can be appropriately lowered with the narrow portion sipe 42.

(4) The pair of the wide portion sipe 41 and the narrow portion sipe 42 positioned on both sides in the tire circumferential direction across the lug groove 21 are set so that the distances L1 and L2 in the tire circumferential direction from the lug groove 21 interposed between the wide portion sipe 41 and the narrow portion sipe 42 are substantially equal to each other, and more specifically, the difference between the distances L1 and L2 is not larger than 10% of the longer one of the distances L1 and L2. Since this substantially equalizes the rigidity between the first blocks 31 adjacent in the tire circumferential direction across the lug groove 21, uneven wear in the tire circumferential direction can be further suppressed.

(5) Each of the crossing angle θ2 of the wide portion sipe 41 to the tire circumferential direction and the crossing angle θ3 of the narrow portion sipe 42 to the tire circumferential direction is set to have an angle difference of ±10% or less to the crossing angle θ1 of the lug groove 21 to the tire circumferential direction. Since this causes the wide portion sipe 41 and the narrow portion sipe 42 to extend substantially parallel to the lug groove 21, the rigidity of the end portion of the first block 31 in the tire circumferential direction is easily reduced substantially uniformly in the tire width direction. Thus, since increase or decrease in local rigidity in the tire width direction is suppressed, uneven wear in the tire width direction can also be suppressed while uneven wear in the tire circumferential direction is suppressed.

Figure 4:
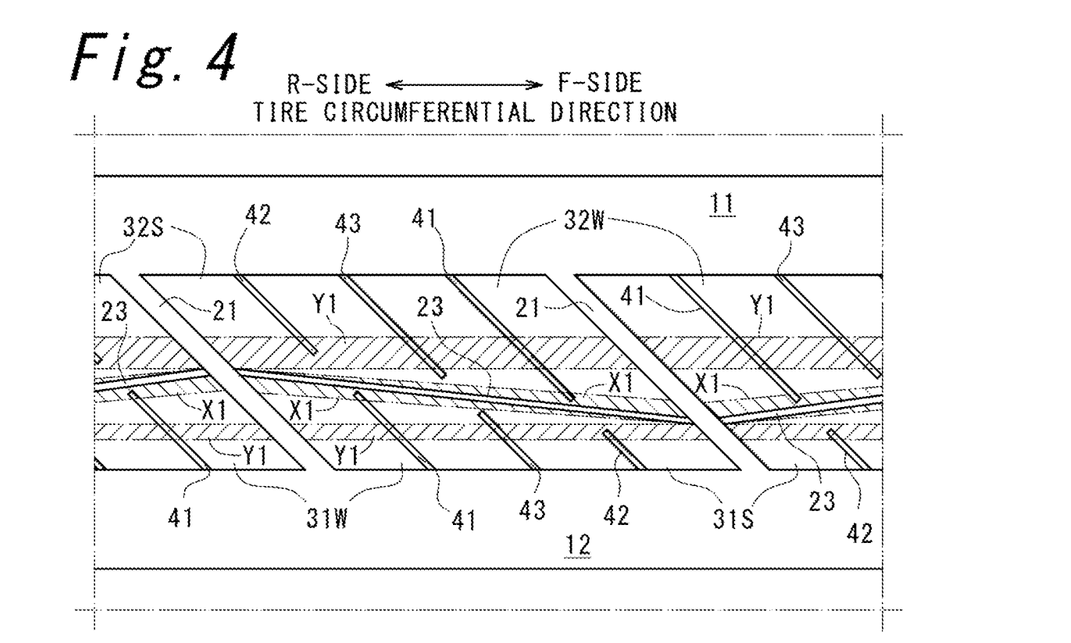
FIG. 4 is a view similar to FIG. 2 showing a circumferential direction sipe according to a modified example.

In the above embodiment, since the circumferential direction sipe 23 is formed so as to slant toward one side in the tire width direction, the wide end portion 31W and the narrow end portion 31S are aligned in the tire circumferential direction between the first blocks 31 (or the second blocks 32) adjacent in the tire circumferential direction across the lug groove 21. However, as shown in FIG. 4, the direction of slanting the circumferential direction sipe 23 toward the tire width direction may be changed for each of the plurality of blocks 30 formed in the tire circumferential direction.

In this case, between the first blocks 31 adjacent in the tire circumferential direction, the wide end portions 31W are adjacent to each other across the lug groove 21, or the narrow end portions 31S are adjacent to each other across the lug groove 21.

Figure 5A:
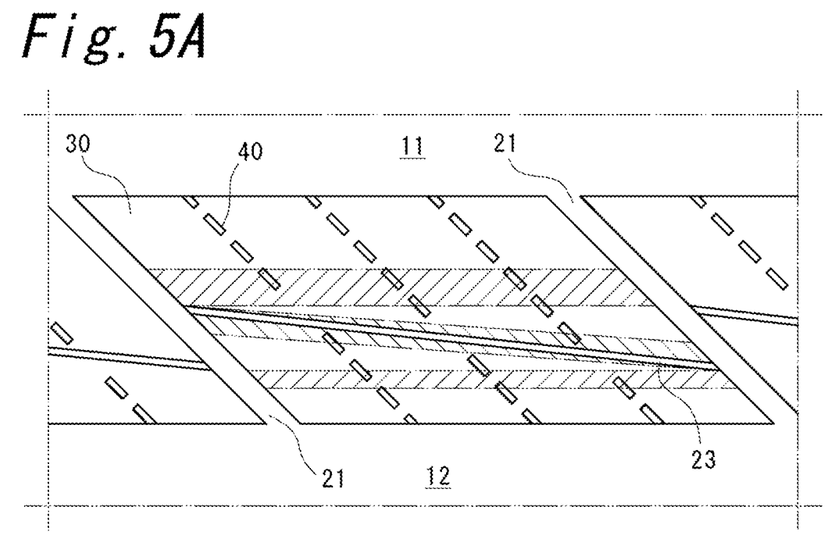
FIG. 5A is a view showing a cross sipe according to a modified example.
Figure 5B:
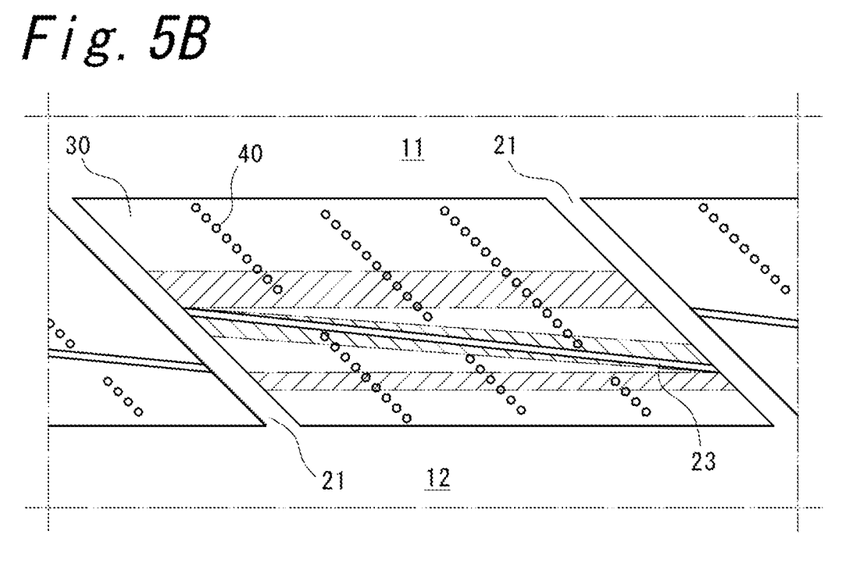
FIG. 5B is a view showing a cross sipe according to a further modified example.

In addition, in the above embodiment, the width direction sipe 40 is configured as a notch continuously extending in the tire width direction from the central main groove 12, but the width direction sipe 40 is not limited to this, and as shown in FIG. 5A, the width direction sipe 40 may be configured to intermittently extend in the tire width direction, or as shown in FIG. 5B, the width direction sipe 40 may be configured as a plurality of hole portions drilled at intervals in the tire width direction, and although illustration is omitted, they may be combined to be configured. In any case, the width direction sipe 40 may be configured to reduce the rigidity of the blocks 30.

In addition, in the above embodiment, a case where the plurality of width direction sipes 40 are formed in each of the first block 31 and the second block 32 partitioned in the tire width direction with the circumferential direction sipe 23 of each of the blocks 30 has been described as an example, but the present invention is not limited to this, and the plurality of width direction sipes 40 may be formed only on any one side of the first block 31 and the second block 32.

Figure 6:
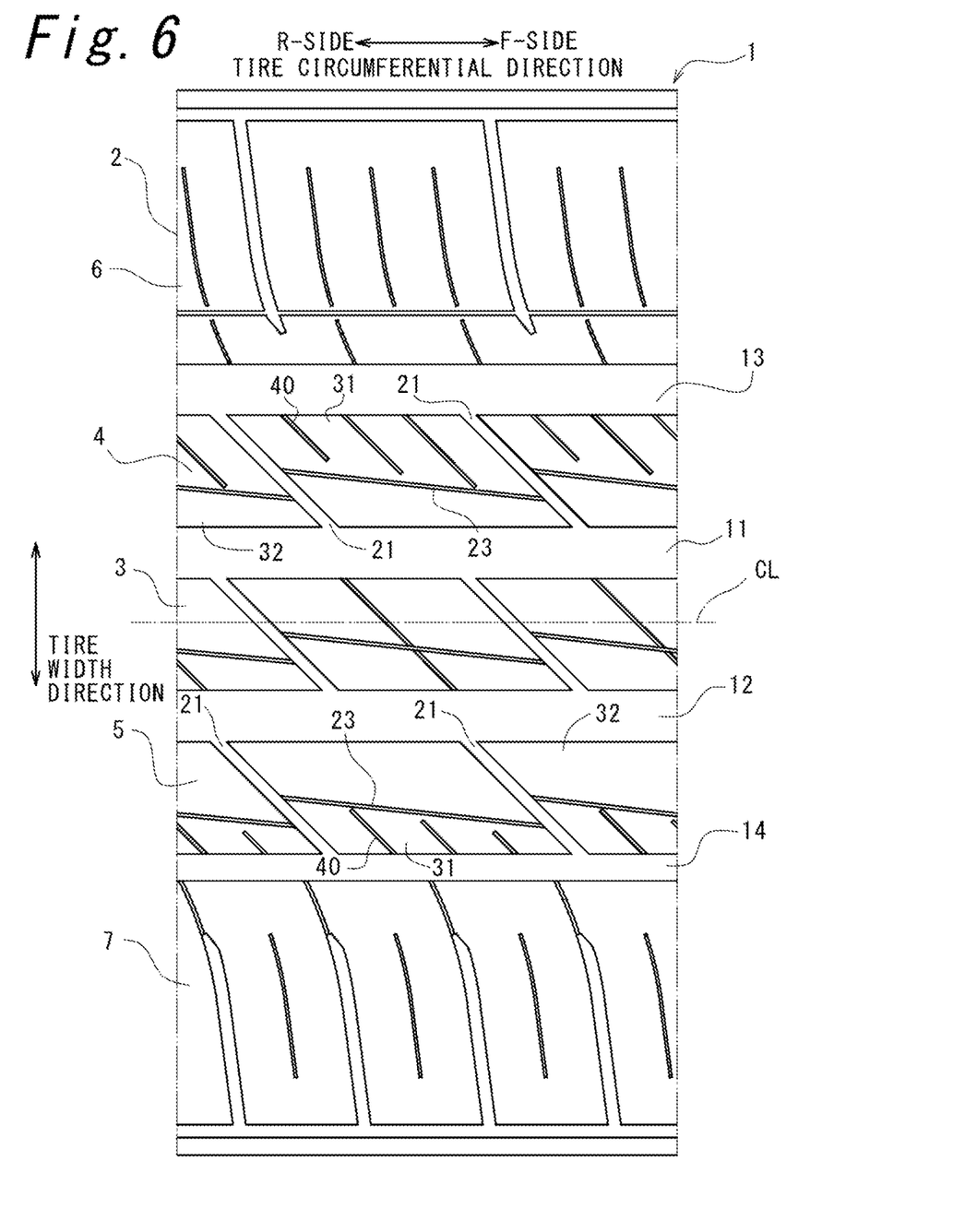
FIG. 6 is a view showing a tread pattern according to a modified example.

For example, in FIG. 6, a case where the circumferential direction sipe 23 and the width direction sipe 40 are formed in the mediate land portions 4 and 5 are exemplified, and in this case, the plurality of width direction sipes 40 may be formed only in the first block 31 positioned on the outer side in the tire width direction of the first block 31 and the second block 32 partitioned in the tire width direction with the circumferential direction sipe 23. In particular, applying the plurality of width direction sipes 40 to the first block 31 positioned on the outer side in the tire width direction, the first block 31 susceptible to deformation input in the tire width direction and the tire circumferential direction during grounding, further suppresses uneven wear, and the present invention can be performed more favorably.

Figure 7:
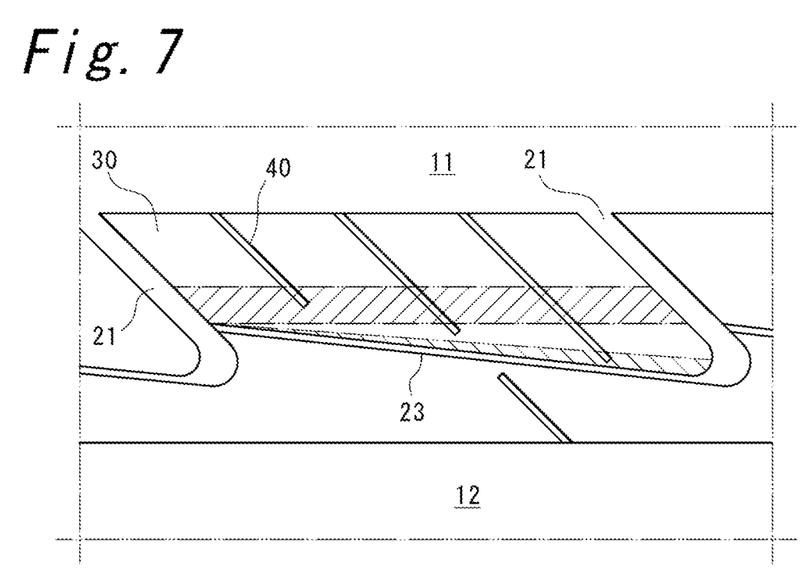
FIG. 7 is a view showing a land portion according to a modified example.

In addition, in the above embodiment, a case where the center land portion 3 is partitioned into the plurality of blocks 30 with the lug groove 21 has been described as an example, but the present invention is not limited to this. As shown in FIG. 7, the present invention is also applied to a rib pattern configured to cause the lug groove 21 to extend in the tire width direction from one end portion communicating with the central main groove 11 to terminate in the middle of the center land portion 3 in the tire width direction without communicating with the central main groove 12.

Also in this case, the circumferential direction sipe 23 only has to be formed in a portion formed between the pair of lug grooves 21 adjacent to each other in the tire circumferential direction, and the plurality of width direction sipes 40 only have to be formed in the partial land portion partitioned on the side of the central main groove 11.

In addition, in the above embodiment, the width direction sipe 40 has been described as an example of a sipe extending in the tire width direction, however, the present invention is not limited to the above embodiment. That is, the sipe may be configured as a cross sipe extending in a direction crossing the extending direction of the circumferential direction sipe 23.

In addition, in the above embodiment, the intermediate portion sipe 43 is formed between the wide portion sipe 41 and the narrow portion sipe 42, but the intermediate portion sipe 43 may not be formed. In addition, even when the intermediate portion sipe 43 is formed, there is no particular limitation, and a plurality of intermediate portion sipes 43 may be formed, in addition, the intermediate portion sipe 43 may be formed so as to terminate in the sipe projection portion X0 or the non-sipe projection portion Y0, further, the intermediate portion sipe 43 may communicate with the circumferential direction sipe 23.

What is claimed is:

1. A pneumatic tire comprising:
    a plurality of main grooves extending in a tire circumferential direction, the plurality of main grooves including a pair of center main grooves which are positioned on both sides of a tire equator line in a tire width direction and a pair of outer main grooves which are positioned on respective outer sides in the tire width direction of the pair of center main grooves;
    a plurality of lateral grooves extending in a tire width direction; and
    a central land portion sandwiched between a pair of mediate land portions, one of the pair of mediate land portions being defined by one of the pair of center main grooves, one of the pair of outer main grooves, and one pair of the plurality of lateral grooves, the other of the pair of mediate land portions being defined by the other of the pair of center main grooves, the other of the pair of outer main grooves, and the other pair of plurality of lateral grooves, each of the pair of mediate land portions including:
        a circumferential direction sipe extending in a direction inclined with respect to the tire circumferential direction;
        an outer partial land portion and an inner partial land portion into which each of the pair of mediate land portions is partitioned by the circumferential direction sipe, the inner partial land portion being closer to the central land portion than the outer partial land portion and the outer partial land portion including a wide end portion on one side and a narrow end portion narrower in width than the wide end portion on the other side in the tire circumferential direction; and
        a plurality of cross sipes extending in a direction intersecting with the circumferential direction sipe in the outer partial land portion,
    wherein the plurality of cross sipes include a wide portion sipe located closest to a wide end of the outer partial land portion in the tire circumferential direction, and a narrow portion sipe located closest to a narrow end of the outer partial land portion in the tire circumferential direction,
    the wide portion sipe has a distal end, positioned closer to the circumferential direction sipe, which is positioned in a sipe projection portion defined by a projection of the circumferential direction sipe in the tire circumferential direction,
    the narrow portion sipe has a distal end, positioned closer to the circumferential direction sipe, which is positioned in a non-sipe projection portion which is a portion other than the sipe projection portion of the outer partial land portion, and
    the inner partial land portion is not formed with any sipes extending in a direction intersecting with the circumferential direction sipe.

2. The pneumatic tire according to claim 1, wherein the distal end of the narrow portion sipe is positioned in a range of one third of the non-sipe projection portion which is located closer to the sipe projection portion in the tire width direction.

3. The pneumatic tire according to claim 1,
    wherein the pneumatic tire comprises a plurality of mediate land portions on each side of the central land portion in the tire width direction,
    wherein a pair of the plurality of mediate land portions adjacent to each other in the tire circumferential direction are separated from each other by one of the plurality of lateral grooves, and
    wherein a difference in distances from the one of the plurality of lateral grooves to a respective pair of cross sipes, positioned closest to the lateral groove in each of the pair of mediate land portions in the tire circumferential direction, is not larger than 10% of a longer distance of the distances.

4. The pneumatic tire according to claim 3, wherein a distance between the one of the plurality of lateral grooves and each of the pair of cross sipes is not smaller than 7% and not larger than 35% of a length in the tire circumferential direction of a respective outer partial land portion in which each of the pair of cross sipes is formed.

5. The pneumatic tire according to claim 3, wherein the one of the plurality of lateral grooves extends in a direction crossing at a crossing angle $\theta1$ to the tire circumferential direction, and
    wherein each of the pair of cross sipes positioned adjacent to each other in the tire circumferential direction across the lateral groove extends at crossing angles $\theta2$ and $\theta3$ to the tire circumferential direction, and
    wherein a difference between the crossing angle $\theta1$ and each of the crossing angles $\theta2$ and $\theta3$ is not larger than 10%.

6. The pneumatic tire according to claim 1, wherein the distal end of the wide portion sipe communicates with the circumferential direction sipe.

7. The pneumatic tire according to claim 1, wherein the circumferential direction sipe slants toward the tire circumferential direction at a slanting angle of 10° or less.

8. The pneumatic tire according to claim 1, wherein a groove width of the circumferential direction sipe is 1.5 mm or less.

9. The pneumatic tire according to claim 1,
    wherein the pneumatic tire comprises a plurality of mediate land portions on each side of the central land portion in the tire width direction,
    wherein a pair of the plurality of mediate land portions adjacent to each other in the tire circumferential direction are separated from each other by one of the plurality of lateral grooves, wherein each of the pair of the plurality of mediate land portions includes a circumference direction sipe, and wherein a circumference direction sipe in one of the pair of the plurality of mediate land portions extends in a direction inclined to different direction from a circumference direction sipe in another one of the pair of the plurality of mediate land portions with respect to the tire circumferential direction.

10. The pneumatic tire according to claim 1, wherein each of the pair of mediate land portions further comprises a partition wall portion between the circumferential direction sipe and one of the plurality of cross sipes, the partition wall portion partitioning the circumferential direction sipe and the one of the plurality of cross sipes from each other, and wherein the partition wall portion has an inner portion in a tire radial direction formed wider in a direction in which the one of the plurality of cross sipes extends than that of an outer portion.

11. The pneumatic tire according to claim 1, wherein the plurality of cross sipes intermittently extend.

12. The pneumatic tire according to claim 1, wherein each of the plurality of lateral grooves extends between a pair of the plurality of main grooves that are adjacent to each other, and has one end which communicates with one of the pair of main grooves and the other end which does not communicate with the other of the pair of main grooves, and wherein the circumferential direction sipe in each of the pair of mediate land portions communicates with both of the pair of lateral grooves, defining the respective of the pair of mediate land portions.

13. The pneumatic tire according to claim 1, wherein the distal end of the wide portion sipe is positioned in a range of one third of the sipe projection portion which is located closer to the circumferential direction sipe in the tire width direction.

* * * * *